(12) United States Patent
Johnson et al.

(10) Patent No.: US 6,879,483 B2
(45) Date of Patent: Apr. 12, 2005

(54) OUTDOOR ELECTRICAL ENCLOSURE AND HOOD THEREFOR

(75) Inventors: Jeffrey L. Johnson, Lincoln, IL (US); Percy A. White, Murphy, NC (US)

(73) Assignee: Eaton Corporation, Cleveland, OH (US)

( * ) Notice: Subject to any disclaimer, the term of this patent is extended or adjusted under 35 U.S.C. 154(b) by 53 days.

(21) Appl. No.: 10/652,466

(22) Filed: Aug. 29, 2003

(65) Prior Publication Data

US 2005/0047097 A1 Mar. 3, 2005

(51) Int. Cl.$^7$ ................................................. H02B 1/10
(52) U.S. Cl. ...................... 361/679; 361/622; 439/535; 312/265.5
(58) Field of Search ................................. 361/622, 654, 361/652, 679–682, 724–727; 312/223.1, 223.2, 265.5, 205; 439/535, 540.1; 337/8, 9

(56) References Cited

U.S. PATENT DOCUMENTS

| | | | |
|---|---|---|---|
| 5,406,449 A | * | 4/1995 | Hicks et al. ................ 361/616 |
| 5,886,868 A | | 3/1999 | White et al. ................ 361/622 |
| 5,913,583 A | * | 6/1999 | Zachoszcz ................... 312/263 |
| 6,046,904 A | | 4/2000 | Kubat ......................... 361/659 |
| 6,233,136 B1 | * | 5/2001 | Peng ........................... 361/600 |
| 6,421,229 B1 | | 7/2002 | Campbell et al. ........... 361/652 |
| 6,589,073 B2 | * | 7/2003 | Lee ............................. 439/535 |

* cited by examiner

Primary Examiner—Hung Van Duong
(74) Attorney, Agent, or Firm—Martin J. Moran

(57) ABSTRACT

A hood is for preventing moisture from penetrating an outdoor electrical enclosure. The outdoor electrical enclosure includes a housing having a panel member, two sidewalls and a bottom wall extending from the panel member to define an opening. A telescoping door covers the opening when closed. The hood includes a unitary top portion with two sides and a panel tab for engaging the housing, and an integral gutter member which overlaps and extends beyond the sidewalls of the housing, in order to divert moisture from the hood to exterior portions of the sidewalls of the outdoor electrical enclosure housing. The integral gutter member has an s-shaped cross-section with an upper portion and a lower portion. When the telescoping door is closed, a door flange overlaps a gutter flange formed by the lower portion. Pin-slide hinges permit the door flange to rest flushly upon the gutter flange.

21 Claims, 5 Drawing Sheets

OUTDOOR ELECTRICAL ENCLOSURE AND HOOD THEREFOR

BACKGROUND OF THE INVENTION

1. Field of the Invention

The present invention relates generally to outdoor electrical enclosures and, more particularly, to outdoor electrical enclosures employing a hood and, still more particularly, to such enclosures employing a hood with a gutter member. The invention also relates to hoods for outdoor electrical enclosures.

2. Background Information

Electrical equipment (e.g., without limitation, relays; circuit breakers; electric meters; transformers) used outdoors are typically housed within an enclosure, such as, for example, a housing, such as a box or cabinet, to protect the electrical equipment from the environment and to prevent electrical faults caused by moisture.

To comply with weather-resistance standards established by the National Electrical Machinery Association (NEMA), including NEMA 3R standards, known prior art electrical enclosures typically comprise a weather-resistant housing made of folded sheet metal. The housing includes a front door which can be opened and closed to access electrical equipment housed therein. Frequently, the doors of such electrical enclosures are attached to the housing in such a way that allows moisture to enter the housing. This can lead to electrical faults and damage to the electrical equipment.

To avoid moisture penetration, known prior art outdoor electrical enclosures employ gutter assemblies as shown in FIGS. 1–3. In particular, a gutter member 2 includes a gutter flange 4 and an attachment tab 6 for attachment to an outdoor electrical enclosure housing 8 by fasteners 10 (e.g., without limitation, screws; rivets; welding). The gutter member 2 is also attached to a hood 12 by fasteners 10.

The two-piece prior art hood construction has several disadvantages. The gutter member 2 is a separately manufactured piece requiring attachment to the hood 12 by numerous fasteners 10. Moisture may penetrate the housing 8 around each of these fasteners 10. Moisture may also enter the housing 8 at the location where the gutter member attachment tab 6 attaches to the housing sidewall 14. Additionally, the housing 8 employs standard leaf-type hinges 16 to attach a door 18 to the housing. These hinges 16 do not permit adjustment of the door 18 for a tight, moisture-proof fit between the door flange 20 and the gutter flange 4. This poor fit is indicated by the gap shown generally at 22 between the door flange 20 and the gutter flange 4. The multi-piece construction, fasteners 10, attachment tab 6 and poorly fitting door 18 all permit moisture to penetrate the housing 8, which could result in damage to electrical equipment housed therein.

U.S. Pat. No. 5,886,868 discloses an electrical distribution panel enclosure adapted for outdoor use. The enclosure includes a box having a front opening covered by a front panel with a cut-out portion. In order to reduce water penetration, the front panel includes a recessed upper portion, which is received in indented portions and in the sidewalls of the box. When the enclosure is assembled, the recessed portion fits underneath the top wall and is covered by an overlapping lip extending from the top wall. Access to the inside of the enclosure is provided by an insert seated in a cut-out portion of the front panel. This insert comprises numerous parts and requires a gasket to prevent water penetration.

U.S. Pat. No. 6,046,904 discloses an electrical equipment cabinet having a barrier with an integral drip channel. The cabinet includes a first compartment adjacent a second compartment with a barrier therebetween to separate first and second pieces of electrical equipment housed therein. The first and second compartments are covered by first and second cover members, respectively. The barrier includes a wall and a drip channel integrally formed with the wall. The drip channel extends longitudinally adjacent the seam formed between the first and second cover members to resist penetration of water into the cabinet. Drip flanges on the first and second cover members extend into the u-shaped drip channel. The integrally formed drip channel has no holes, thus providing a continuous water-resistant surface. Although the disclosed integrally formed drip channel resists water penetration at the seams between the cover members of the cabinet, no provision is made to resist moisture penetration around the top portions of the cover members.

U.S. Pat. No. 6,421,229 discloses a combination meter/breaker panel enclosure with a rain gutter. A meter side cover includes an integral u-shaped rain gutter with an upper flange and a lower flange structured to vector water away from the meter-breaker system to maintain high electrical operating characteristics. A breaker cover includes a lip that overlaps and protrudes downwardly into the unshaped region of the gutter to provide a weather secure arrangement between the meter cover and the breaker cover. Water which collects on the face of either cover is channeled into the bottom most portions of the u-shaped member and downwardly away from the abutting covers. However, both the meter and breaker covers have openings which are susceptible to moisture penetration. Although the disclosed rain gutter resists water penetration at the vertical drip seams where the meter cover and breaker cover flanges overlap, no provision is made to resist moisture penetration around the top portions of the cover members.

There is a need, therefore, for a simplified, outdoor electrical enclosure and hood capable of improved moisture-resistance.

Accordingly, there is room for improvement in hoods for outdoor electrical enclosures and in outdoor electrical enclosures employing hoods.

SUMMARY OF THE INVENTION

These needs and others are satisfied by the present invention, which provides a hood with an integral gutter member for an outdoor electrical enclosure. The enclosure includes the hood and a telescoping door to minimize moisture penetration and electrical faults associated therewith.

As one aspect of the invention, a hood for an outdoor electrical enclosure including a back panel, two sidewalls and a bottom wall extending from the back panel to define a front opening, and a door structured to cover the front opening, comprises: a unitary top portion having two sides and a back structured to engage the sidewalls and the back panel, respectively, of the outdoor electrical enclosure, the unitary top portion also having an integral gutter member structured to overlap and extend beyond the sidewalls of the outdoor electrical enclosure, in order to divert moisture from the hood to exterior portions of the sidewalls of the outdoor electrical enclosure.

As another aspect of the invention, an outdoor electrical enclosure comprises: a housing including a panel member, two sidewalls and a bottom wall extending from the panel member to define an opening; a door structured to cover the opening; and a hood comprising: a unitary top portion having two sides and a panel tab engaging the sidewalls and the panel member, respectively, of the housing, the unitary top portion also having an integral gutter member overlapping and extending beyond the sidewalls of the housing, in order to divert moisture from said hood to exterior portions of the sidewalls of the housing.

The integral gutter member may include opposing first and second ends each of which may have an edge portion. Each of the sidewalls of the housing may include a corresponding notch structured to receive a corresponding one of the edge portions, which may overlap and extend beyond the corresponding notch.

At least a portion of each of the sides of the unitary top portion may overlap at least a portion of the edge portions of the opposing first and second ends of the integral gutter member.

The integral gutter member may have an s-shaped cross-section with an upper portion and a lower portion. The door may include a front surface, a back surface and a door flange. The upper portion of the s-shaped cross-section of the integral gutter member may extend beyond the front surface of the door when the door covers the front opening. The lower portion of the s-shaped cross-section of the integral gutter member may include a gutter flange forming a channel which receives the door flange. The door flange may overlap the gutter flange when the door is closed.

The door may be a telescoping door including pin-slide hinges adapted to permit the telescoping door to move up and down, in order that the door flange rests upon the gutter flange when the telescoping door is closed.

As another aspect of the invention, an outdoor electrical enclosure comprises: a housing including a panel member, two sidewalls and a bottom wall extending from the panel member to define an opening; at least one internal barrier structured to divide the housing into at least two separate compartments; at least two doors each of which is structured to cover a corresponding one of the at least two separate compartments; and a hood comprising: a unitary top portion having two sides and a panel tab engaging the sidewalls and the panel member, respectively, of the housing, the unitary top portion also having an integral gutter member overlapping and extending beyond the sidewalls of the housing, in order to divert moisture from the hood to exterior portions of the sidewalls of the housing.

The at least one internal barrier may include a gutter adapted to divert moisture from the at least two separate compartments to exterior portions of the bottom wall of the housing. The integral gutter member may include a moisture passageway to provide fluid communication between the integral gutter member of the unitary top portion and the gutter of the at least one internal barrier.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, the present invention will be described as applied to an outdoor electrical enclosure for enclosing electrical equipment (e.g., without limitation, relays; circuit breakers; electric meters; transformers), although it will become apparent that it could also be applied to other types of enclosures adapted for outdoor weather-resistant use.

As employed herein, the term "leaf-type hinge" refers to a vertically immobile hinge commonly used to pivotally attach a door to a housing of an enclosure, such as, for example, the hinged door of a cabinet. The hinge does not permit any vertical adjustment of the door with respect to, for example, the cabinet.

As employed herein, the term "telescoping door" refers to a door that may adjust vertically up and down with respect to an enclosure such as, for example, a cabinet via, for example, pin-slide hinges, in order to provide an improved fit between the door and the cabinet.

As employed herein, the term "pin-slide hinge" refers to a hinge used to attach, for example, a telescoping door to a housing of an enclosure such as, for example, a cabinet. The pin-slide hinge permits vertical movement and adjustment of a first hinge element, attached to the door, with respect to a second, stationary pin-slide element attached to the enclosure housing.

As employed herein, the term "Tox-lock" refers to a fastening mechanism in which a mechanical weld is created by metal deformation such as, for example, at the corners, edge portions and seams of a metallic cabinet, which are folded and deformed to create mechanical welds therein.

Figure 4:
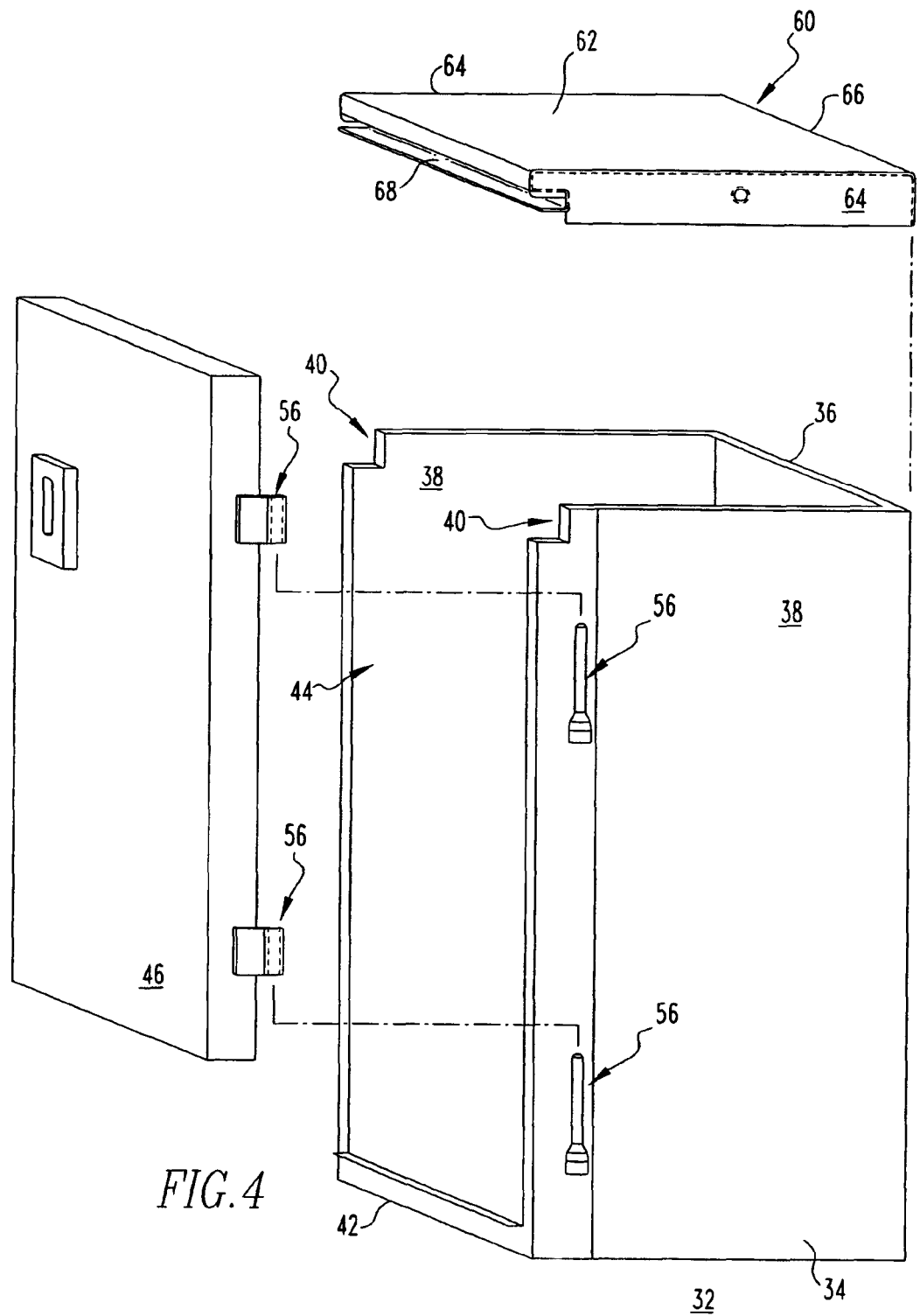
FIG. 4 is an exploded, isometric view of an outdoor electrical enclosure assembly in accordance with the present invention.

FIG. 4 illustrates a hood 60 for an outdoor electrical enclosure 32. As shown, the basic components of the outdoor electrical enclosure 32 include a housing 34 consisting of a panel member 36, two sidewalls 38 and a bottom wall 42 extending from the panel member 36 to define an opening 44, and a door 46 structured to cover the opening 44. As shown, the exemplary panel member 36 is a back panel and the exemplary opening 44 is a front opening. The hood 60 includes a unitary top portion 62 having two sides 64 and a panel tab 66 structured to engage the sidewalls 38 and the panel member 36, respectively, of the outdoor electrical enclosure 32. As shown, the exemplary panel tab 66 is the back of the unitary top portion 62, which is structured to engage the exemplary back panel 36 of the outdoor electrical enclosure 32.

Figure 1:
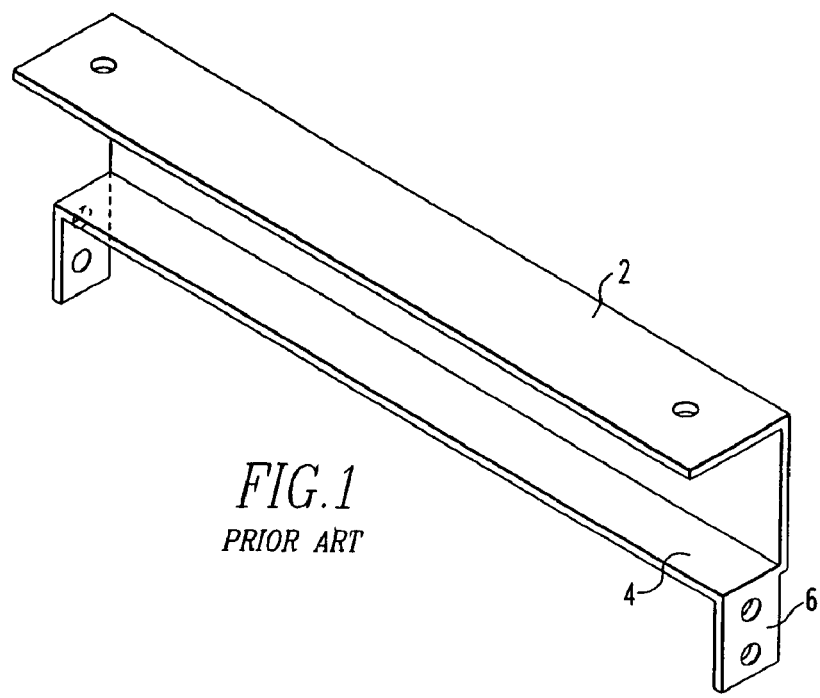
FIG. 1 is an isometric view of a gutter for an outdoor electrical enclosure.
Figure 2:
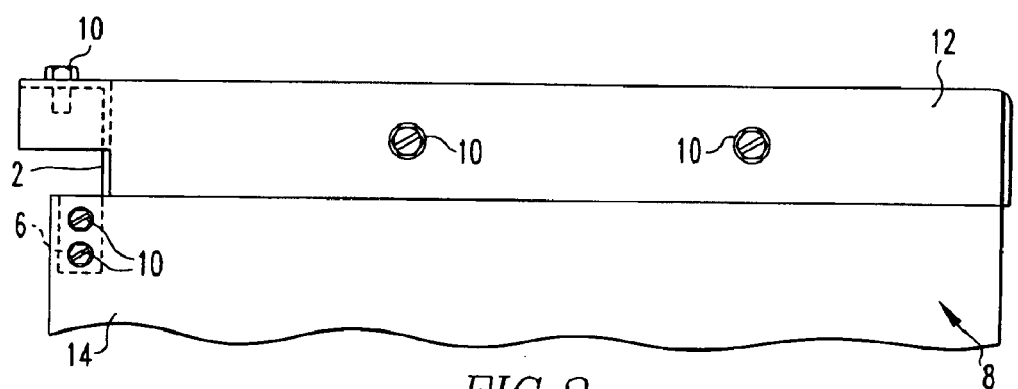
FIG. 2 is a vertical elevational view of the gutter of FIG. 1 as employed on an outdoor electrical enclosure.
Figure 3:
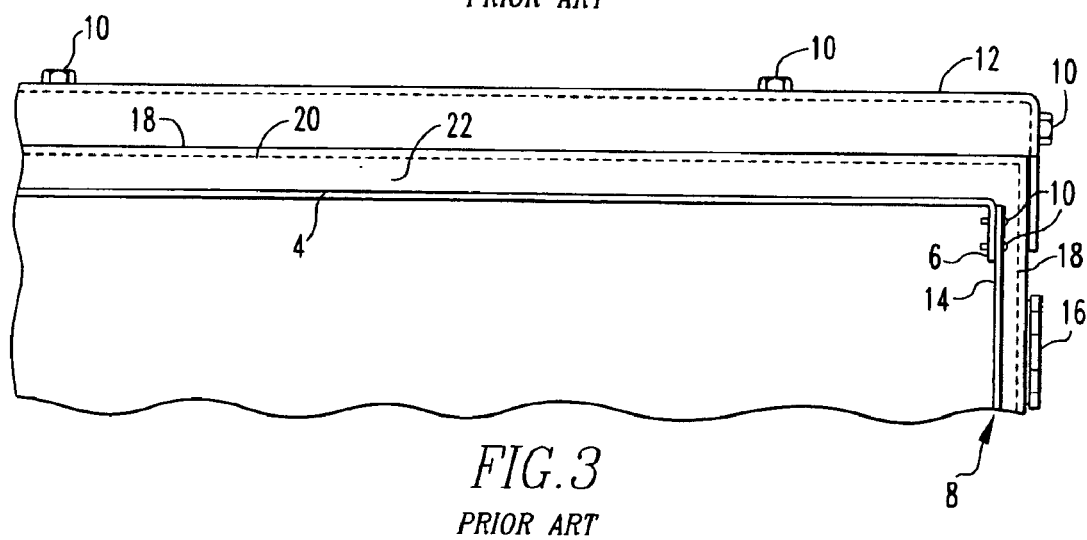
FIG. 3 is a vertical elevation view of a portion of the outdoor electrical enclosure assembly of FIG. 2.

An integral gutter member 68, formed within the unitary top portion 62, is structured to overlap and extend beyond the sidewalls 38 of the outdoor electrical enclosure 32, in order to divert moisture from the hood 60 to exterior portions of the sidewalls 38 of the outdoor electrical enclosure 32. The integral gutter member 68 eliminates the need for attachment of a separate gutter member (see the separate gutter member 2 of FIGS. 1–3) by numerous fasteners (see the fasteners 10 of FIGS. 1–3), thereby eliminating sources of moisture penetration around the fasteners 10 (FIGS. 1–3) and between the separate gutter member 2 (FIGS. 1–3) and between the hood attachment tab 6 (FIGS. 1–3) and housing 8 (FIGS. 2 and 3).

Continuing to refer to FIG. 4, the sidewalls 38 of the outdoor electrical enclosure 32 include notches 40 for receiving the integral gutter member 68. When the hood 60 is attached to the housing 34 (FIGS. 6 and 8), the opposing ends 78, 80 (FIGS. 6 and 8) of the integral gutter member 68 overlap the notches 40 (best shown with one of the notches 40 in FIG. 6) in order to divert moisture to exterior portions of the housing sidewalls 38. Thus, moisture penetration, which previously occurred between the attachment tabs 6 (FIGS. 1–3) and housing sidewalls 14 (best shown in FIG. 3), is eliminated. As shown, the exemplary door 46 is attached to the housing 34 by hinges, such as the exemplary pin-slide hinges 56.

Figure 5:
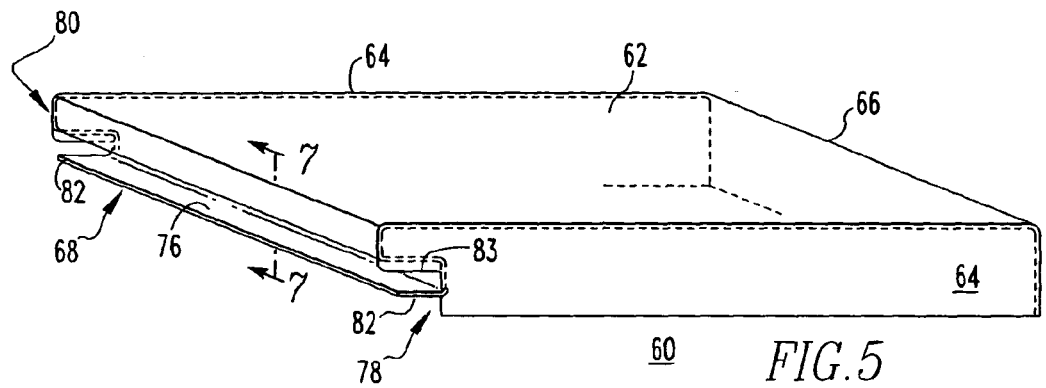
FIG. 5 is an isometric view of the hood of the outdoor electrical enclosure assembly of FIG. 4.

As shown in FIG. 5, the exemplary hood 60 of the outdoor electrical enclosure 32 (FIG. 6) includes the unitary top portion 62, the two sides 64 and the back 66. The hood 60 also includes the integral gutter member 68 integrally formed within the unitary top portion 62. The integral gutter member 68 includes a gutter flange 76 extending between the ends 78,80. Each of the first and second ends 78,80 includes an edge portion 82. At least a portion 83 of each of the sides 64 of the unitary top portion 62 overlaps at least a portion of the edge portions 82 of the opposing first and second ends 78,80, in order to resist environmental moisture (e.g., without limitation, rain; snow; sleet; mist) from entering the unitary gutter member 68. In the event that moisture does enter the unitary gutter member 68, the gutter flange 76 is structured to divert water outwardly beyond the edge portions 82 of the gutter flange 76 to exterior portions of the sidewalls 38 of the outdoor electrical enclosure 32 (FIG. 6).

Figure 6:
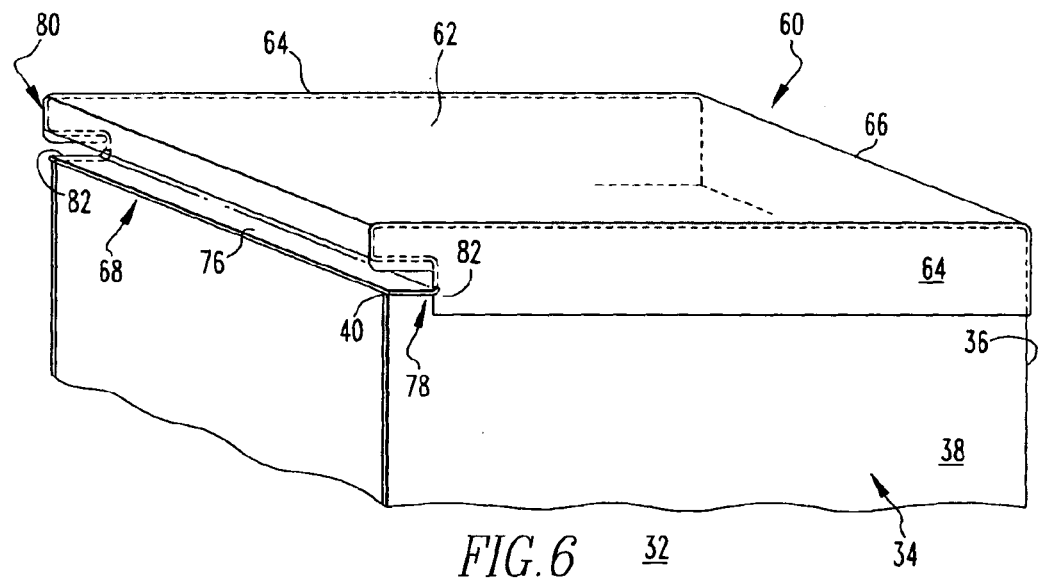
FIG. 6 is an isometric view of a portion of the outdoor electrical enclosure assembly of FIG. 4 with the door removed to show hood structures.

FIG. 6 shows the hood 60 as employed on the housing 34 of the outdoor electrical enclosure 32 with the door 46 (FIG. 4) removed for ease of illustration. As shown, the exemplary sides 64 and back panel tab 66 of the unitary top portion 62 of the exemplary hood 60 slide over and engage the sidewalls 38 and back panel 36, respectively, of the exemplary housing 34. The hood 60 may be attached to the housing 34 by any suitable fastening mechanism 58 (e.g., without limitation, screws; rivets; spot welding; welding; Tox-lock; press-fit). The hood 60 may be attached to the housing 34 at the sides 64, the back 66 (not shown) or at any combination of both the sides 64 and back 66 (not shown).

Continuing to refer to FIG. 6, the integral gutter member 68 overlaps and extends beyond the sidewalls 38 of the housing 34, in order to divert moisture from the hood 60 to exterior portions of the sidewalls 38 of the housing 34. More specifically, the edge portions 82 of the first and second ends 78,80, respectively, of the gutter flange 76 extend beyond the notches 40 (best shown in FIG. 4) in the sidewalls 38 of the housing 34, in order to prevent moisture from entering the housing 34, as discussed above.

Figure 7:
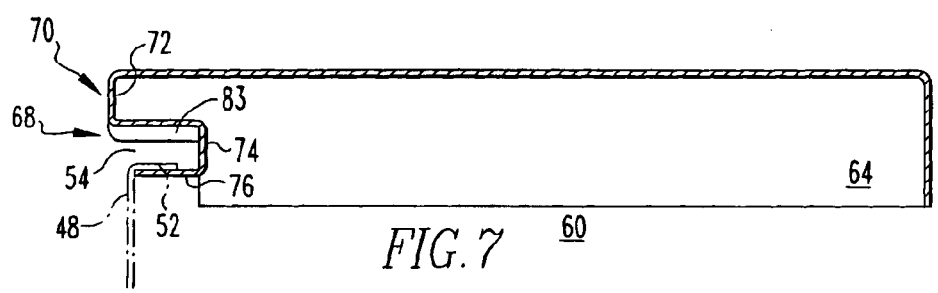
FIG. 7 is a cross-sectional view taken along line 7—7 of FIG. 5.

As shown in FIG. 7, the exemplary integral gutter member 68 of the hood 60 has an s-shaped cross-section 70 with an upper portion 72 and a lower portion 74. The lower portion 74 includes the gutter flange 76 forming the channel 54 to divert moisture away from the hood 60. As shown, at least a portion 83 of each of the sides 64 overlaps the upper portion 72 of the integral gutter member 68, in order to provide environmental moisture-resistance as discussed above.

The exemplary hood 60 is formed from galvanized steel. However, it will be appreciated that any suitable weather-resistant material could be employed. It will also be appreciated that the integral gutter member 68 could have any suitable cross-sectional shape (not shown) other than the exemplary s-shaped cross-section 70.

Figure 8:
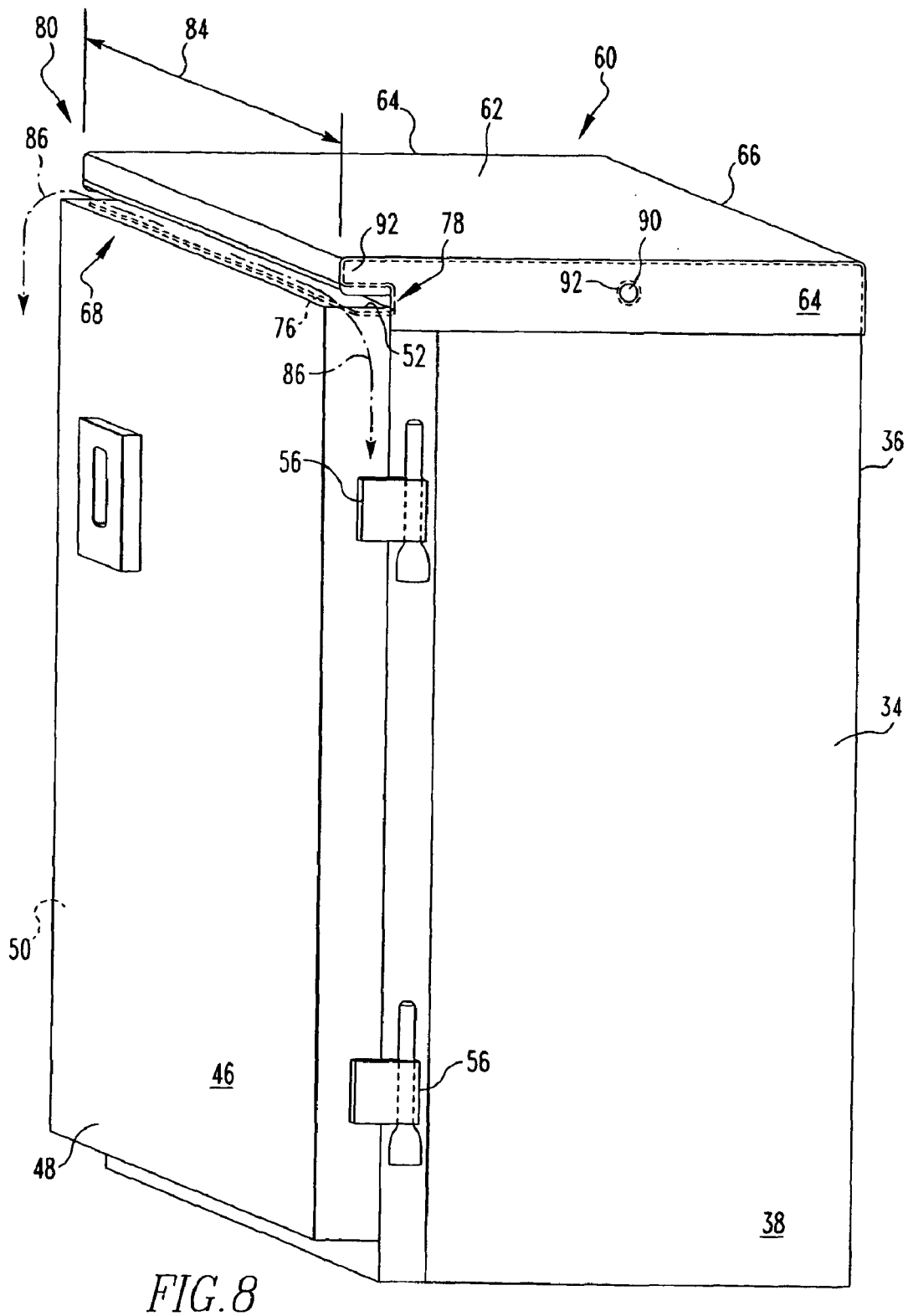
FIG. 8 is an isometric view of the outdoor electrical enclosure assembly of FIG. 4.

FIG. 8 shows the outdoor electrical enclosure 32 assembled with the door 46 in the closed position. The exemplary door 46 is a telescoping door attached to the outdoor electrical enclosure housing 34 by pin-slide hinges 56. The pin-slide hinges 56 permit the telescoping door 46 to move vertically up and down, in order to permit proper alignment of the door 46 with respect to the housing 34. For example, the pin-slide hinges 56 permit the door 46 to be lifted vertically when closing the door 46 (not shown), in order that the door flange 52 may be inserted into the lower portion 74 (FIG. 7) of the integral gutter member 68 to overlap the gutter flange 76 when the door 46 is closed. Ideally, the pin-slide hinges 56 then permit the door 46 to slide slightly downward, in order that the door flange 52 (shown in phantom line drawing in FIG. 7) rests flushly upon the entire length 84 of the gutter flange 76, when the door 46 is closed, as shown. This flush fit, facilitated by the pin-slide hinges 56, greatly improves moisture-resistance by eliminating the gap (see, for example, gap 22 between gutter flange 4 and door flange 20 of FIG. 3) between the gutter flange 76 and door flange 52, thereby resisting penetration of moisture around the door 46 and into the housing 34.

As discussed above, the integral gutter member 68 provides additional moisture-resistance by diverting moisture outwardly down the gutter flange 76 away from the hood 60 to exterior portions of the sidewalls 38 of the outdoor electrical enclosure 32. This path of moisture diversion is indicated generally by reference 86.

Still further moisture-resistance is provided by the sides 64 and integral gutter member 68, respectively, of the unitary top portion 62. As shown, the door 46 has a front surface 48 and a back surface 50. The upper portion 72 of the exemplary s-shaped cross-section (best shown in FIG. 7) of the integral gutter member 68 overhangs and extends beyond the front surface 48 (shown in phantom line drawing in FIG. 7) of the door 46 to shield the gutter flange 76 from environmental moisture (e.g., without limitation, rain, snow, sleet; mist). Additionally, as discussed above, the sides 64 of the unitary top portion 62 overlap at least a portion of the edge portions 82 (FIG. 6) of the first and second ends 78,80 (FIG. 6), respectively, of the integral gutter member 68. These overhanging and overlapping features of the integral gutter member upper portion 72 and hood sides 64, respectively, help minimize the potential for moisture to enter the integral gutter member 68, thereby minimizing the likelihood of moisture penetrating the housing 34 and electrical failures associated therewith.

Continuing to refer to FIG. 8, at least one of the sides 64 of the exemplary unitary top portion 62 includes at least one lance 90 (one is shown in FIG. 8) and at least one of the sidewalls 38 of the housing 34 includes at least one dimple 92 (one is shown in FIG. 8). The lance 90 of the unitary top portion 62 engages the dimple 92, in order to facilitate alignment of the hood 60 on the housing 34. It will be appreciated that any combination of lances 90 and dimples 92 may be employed on the hood 60 and housing 34 to facilitate alignment. It will also be appreciated that any suitable alternative alignment mechanism (not shown) may be employed or, alternatively, that no alignment mechanism is necessary. Additionally, once aligned, any combination of suitable fastening mechanisms (e.g., without limitation, screws; rivets; spot welding; welding; Tox-lock; press-fit) (see, for example, press-fit fastening mechanism 58 of FIG. 6) may be employed to fasten any combination of the hood sides 64 and back 66 to the sidewalls 38 and back panel 36, respectively, of the outdoor electrical enclosure housing 34.

Figure 9:
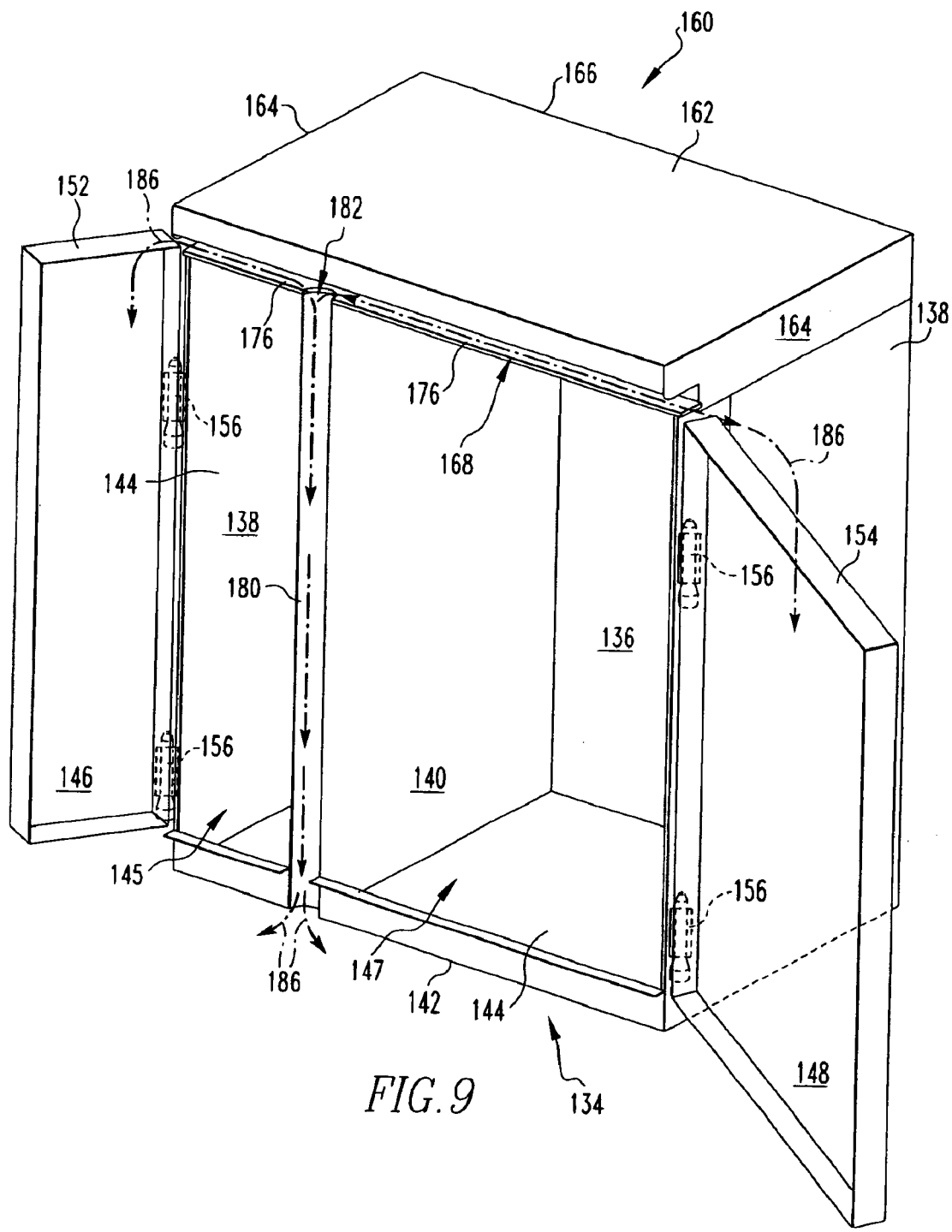
FIG. 9 is an isometric view of an outdoor electrical enclosure assembly in accordance with another embodiment of the invention.

FIG. 9 illustrates an example of an alternative embodiment of an outdoor electrical enclosure 132 similar to the outdoor electrical enclosure 32 discussed above (FIGS. 4–8), but additionally including at least one internal barrier 140 (one is shown in FIG. 9) structured to divide the housing 134 into at least two separate compartments 145,147 (two are shown in FIG. 9).

Similar to outdoor electrical enclosure 32, the outdoor electrical enclosure 132 includes a hood 160, and a housing 134 consisting of a panel member 136 with sidewalls 138 and a bottom wall 142 extending from the panel member 136 to form an opening 144. The outdoor electrical enclosure 132 also includes at least two doors 146,148 (two are shown in FIG. 9). Each door 146,148 is structured to cover a corresponding one of the separate compartments 145,147, respectively. Each of the doors 146,148 includes a door flange 152,154, respectively, which overlaps the gutter flange 176 of the integral gutter member 168 when the doors 146,148 are closed (not shown). As shown, the exemplary internal barrier 140 is a single barrier including a gutter 180 adapted to divert moisture from the two separate compartments 145,147 to exterior portions of the bottom wall 142 of the housing 134.

As shown, the hood 160 includes the unitary top portion 162 consisting of two sides 164 and the panel tab 166 structured to engage the sidewalls 138 and panel member 136, respectively, of the outdoor electrical enclosure housing 134. The unitary top portion 162 also includes the integral gutter member 168 structured to divert moisture from the hood 160 to exterior portions of the sidewalls 138 of the outdoor electrical enclosure housing 134.

The gutter flange 176 of the exemplary integral gutter member 168 includes a moisture passageway 182, in order to provide fluid communication between the integral gutter member 168 of the unitary top portion 162 of the hood 160 and the gutter 180 of the exemplary internal barrier 140. It will be appreciated that the moisture passageway 182 may consist of, for example, any notch, hole, slit or opening or combination thereof (not shown), for suitably providing fluid communication between the integral gutter member 168 and the gutter 180 of the internal barrier 140. Both the horizontal path of moisture along the integral gutter member 168 and the vertical moisture path along the internal barrier gutter 180 are generally shown by reference 186.

It will be appreciated that the outdoor electrical enclosure 132 may include any number of internal barriers (not shown) to form any number of separate compartments, for example, 145,147, covered by any number of doors, for example, 146,148. It will also be appreciated that any combination of gutters 180 and moisture passageways 182, other than the illustrative example of FIG. 9, may be employed.

Continuing to refer to FIG. 9, it will be appreciated that pin-slide hinges 156, as discussed above, may be employed to attach one or more of the doors, for example, 146,148, to the housing 134. However, any suitable alternative door attachment (not shown) may be employed, not only in this embodiment, but in all embodiments contemplated by the invention, to attach each door, for example, 46,146,148, to the outdoor electrical enclosure housing, for example, 34,134.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only, and not limiting as to the scope of the invention which is to given the full breadth of the claims appended and any and all equivalents thereof.

What is claimed is:

1. A hood for an outdoor electrical enclosure including a back panel, two sidewalls and a bottom wall extending from said back panel to define a front opening, and a door structured to cover said front opening, said hood comprising:

a unitary top portion having two sides and a back structured to engage the sidewalls and the back panel, respectively, of said outdoor electrical enclosure, said unitary top portion also having an integral gutter member structured to overlap and extend beyond the sidewalls of said outdoor electrical enclosure, in order to divert moisture from said hood to exterior portions of the sidewalls of said outdoor electrical enclosure.

2. The hood of claim 1 wherein said integral gutter member has an s-shaped cross-section with an upper portion and a lower portion.

3. The hood of claim 1 wherein said unitary top portion is formed from galvanized steel.

4. An outdoor electrical enclosure comprising:

a housing including a panel member, two sidewalls and a bottom wall extending from said panel member to define an opening;

a door structured to cover said opening; and a hood comprising:

a unitary top portion having two sides and a panel tab engaging the sidewalls and the panel member, respectively, of said housing, said unitary top portion also having an integral gutter member overlapping and extending beyond the sidewalls of said housing, in order to divert moisture from said hood to exterior portions of the sidewalls of said housing.

5. The outdoor electrical enclosure of claim 4 wherein said panel member is a back panel; wherein said opening is a front opening; and wherein said door covers said front opening when said door is closed.

6. The outdoor electrical enclosure of claim 4 wherein said integral gutter member includes opposing first and second ends each of which has an edge portion; and wherein each of the sidewalls of said housing includes a corresponding notch structured to receive a corresponding one of said edge portions, which overlaps and extends beyond the corresponding notch.

7. The outdoor electrical enclosure of claim 4 wherein said integral gutter member has an s-shaped cross-section with an upper portion and a lower portion.

8. The outdoor electrical enclosure of claim 4 wherein at least one of the sides of said unitary top portion includes at least one lance; wherein at least one of the sidewalls of said housing includes at least one dimple; and wherein the at least one lance of said unitary top portion engages the at least one dimple, in order to align said hood on said housing.

9. The outdoor electrical enclosure of claim 4 wherein the sides and the panel tab of said unitary top portion slide over the sidewalls and the panel member, respectively, of said housing.

10. The outdoor electrical enclosure of claim 4 wherein said hood and said housing are made from galvanized steel.

11. The outdoor electrical enclosure of claim 6 wherein at least a portion of each of the sides of said unitary top portion overlaps at least a portion of the edge portions of said opposing first and second ends of said integral gutter member.

12. The outdoor electrical enclosure of claim 7 wherein said door includes a front surface, a back surface and a door flange; and wherein the upper portion of said s-shaped cross-section of said integral gutter member extends beyond the front surface of said door when said door covers said front opening.

13. The outdoor electrical enclosure of claim 9 wherein said hood is attached to said housing by fastening means at at least one of the panel tab and the sides of said unitary top portion.

14. The outdoor electrical enclosure of claim 12 wherein the lower portion of said s-shaped cross-section of said integral gutter member includes a gutter flange forming a channel which receives said door flange.

15. The outdoor electrical enclosure of claim 14 wherein said door flange overlaps said gutter flange when said door is closed.

16. The outdoor electrical enclosure of claim 15 wherein said gutter flange includes two ends with a length therebetween; and wherein said door flange rests flushly upon the entire length of said gutter flange between said ends.

17. The outdoor electrical enclosure of claim 15 wherein said door is a telescoping door further including pin-slide hinges adapted to permit said telescoping door to move up and down, in order that said door flange rests upon said gutter flange when said telescoping door is closed.

18. An outdoor electrical enclosure comprising:
   a housing including a panel member, two sidewalls and a bottom wall extending from said panel member to define an opening;
   at least one internal barrier structured to divide said housing into at least two separate compartments;
   at least two doors each of which is structured to cover a corresponding one of said at least two separate compartments; and
   a hood comprising:
      a unitary top portion having two sides and a panel tab engaging the sidewalls and the panel member, respectively, of said housing, said unitary top portion also having an integral gutter member overlapping and extending beyond the sidewalls of said housing, in order to divert moisture from said hood to exterior portions of the sidewalls of said housing.

19. The outdoor electrical enclosure of claim 18 wherein said integral gutter member includes a gutter flange; and wherein each of said at least two doors includes a door flange overlapping said gutter flange when said each of said at least two doors covers the corresponding one of said at least two separate compartments.

20. The outdoor electrical enclosure of claim 19 wherein said at least one internal barrier includes a gutter adapted to divert moisture from said at least two separate compartments to exterior portions of the bottom wall of said housing; and wherein said integral gutter member of said unitary top portion is in fluid communication with the gutter of said at least one internal barrier.

21. The outdoor electrical enclosure of claim 20 wherein said integral gutter member includes a moisture passageway; and wherein said moisture passageway provides said fluid communication between said integral gutter member of said unitary top portion and the gutter of said at least one internal barrier.

\* \* \* \* \*